United States Patent
Howard et al.

(10) Patent No.: US 7,391,223 B2
(45) Date of Patent: Jun. 24, 2008

(54) INSULATION BARRIER FOR UNSHIELDED WIRE

(75) Inventors: Patrick C. Howard, Austin, TX (US); Ge Jiang, Cedar Park, TX (US); Jeffrey A. Lim, Austin, TX (US); Sywong Ngin, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/538,666

(22) Filed: Oct. 4, 2006

(65) Prior Publication Data

US 2008/0084221 A1   Apr. 10, 2008

(51) Int. Cl.
*G01R 27/26* (2006.01)

(52) U.S. Cl. .................. 324/662; 324/660; 324/661; 73/780; 280/735; 340/667; 701/45

(58) Field of Classification Search ......... 324/660–662; 73/780; 280/735; 340/667
See application file for complete search history.

(56) References Cited

U.S. PATENT DOCUMENTS

| 5,612,876 | A | * | 3/1997 | Zeidler et al. ................. 701/45 |
| 5,914,610 | A | | 6/1999 | Gershenfeld et al. |
| 5,936,412 | A | | 8/1999 | Gershenfeld et al. |
| 6,135,494 | A | * | 10/2000 | Lotito et al. ................ 280/731 |
| 6,683,583 | B2 | | 1/2004 | Ngin |

* cited by examiner

*Primary Examiner*—Vincent Q Nguyen
(74) *Attorney, Agent, or Firm*—John A. Burtis

(57) ABSTRACT

A sensor assembly has a plurality of sensing elements configured to be positioned within a seat of a vehicle. Each of the sensing elements include an output signal indicating the presence or absence of an occupant. The sensor assembly includes a cable with a plurality of conductors that are in electrical communication with the output signals of the sensing elements. The sensor assembly further provides a non-conductive spacer positioned between the cable and the plurality of sensing elements. A method for providing a sensor assembly having a spacer between sensing elements and conductors attached thereto to reduce unwanted coupling of signals onto the conductors is also disclosed.

17 Claims, 6 Drawing Sheets

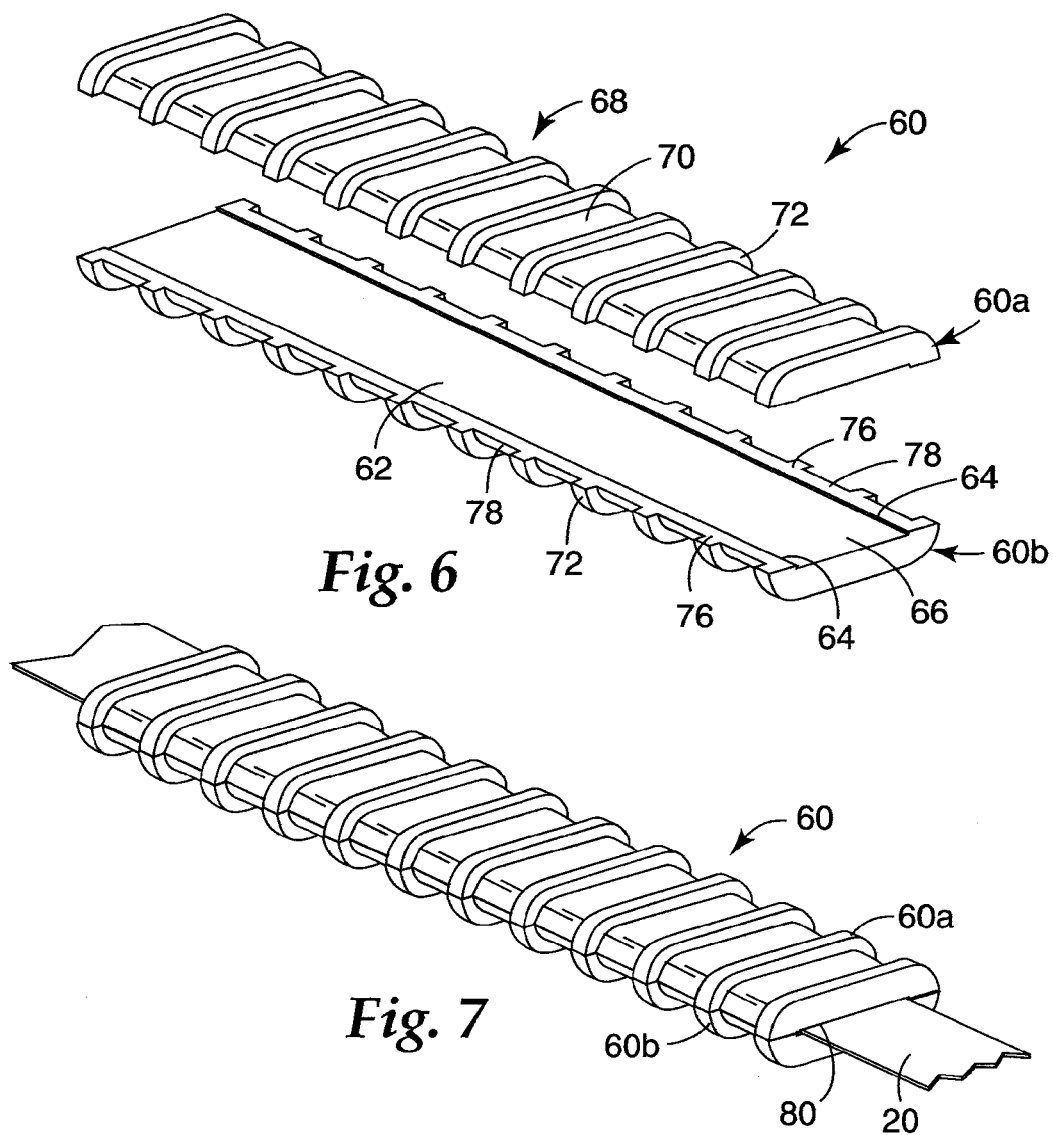
Fig. 6
Fig. 7
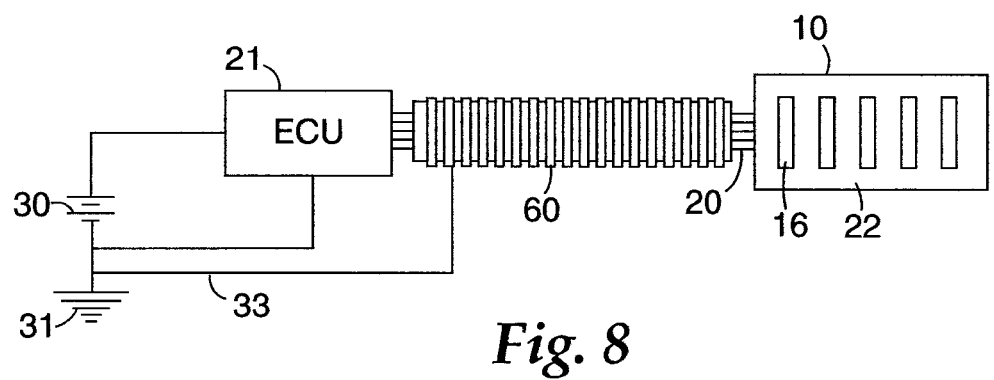
Fig. 8

INSULATION BARRIER FOR UNSHIELDED WIRE

TECHNICAL FIELD

The present invention relates to a sensor assembly. More particularly, the present invention relates to a sensor assembly including a dielectric cover extending over conductors that are attached to sensor elements.

BACKGROUND

Sensor assemblies may be used to monitor the position, orientation, presence, motion, or size of a person or object within a defined space. For example, sensor assemblies can be used to detect the presence of a person or object within a car seat. One type of sensor that is used in applications such as sensing a person or object in a car seat is disclosed in U.S. Pat. No. 6,683,583 assigned to 3M Innovative Properties Company of St. Paul, Minn., which is hereby incorporated by reference in its entirety. Sensors of this type have an antenna that propagates a signal in the area of the seat. The presence of a person or object in the defined seating area may affect the impedance around a sensing element of a sensor assembly, thereby providing information regarding the position, orientation, presence and/or size of the person or object. The antenna has a signal wire that extends from the sensor to an electronic control unit (ECU). The signal sent from the sensor assembly provides information to the ECU regarding any object within the defined seating area. Due to the nature of the sensing element, that is, the antennas that propagate a signal into the area surrounding the car seat, it is possible that a signal may be induced onto unshielded signal wires, which are connected to the ECU. Unwanted induced signals may provide false indicators to the ECU.

SUMMARY

In one aspect, the invention relates to a sensor assembly that is configured to detect whether a vehicle seat is occupied. The sensor assembly includes sensing elements configured to be positioned within the seat that are capable of detecting the presence or absence of an object on a portion of the seat. Each of the sensing elements provides output of an electrical signal indicative of the detection. At least one of the sensing elements is attached to, and in electrical communication with, an unshielded flat cable. Some embodiments described herein relate to flat cables, but skilled artisans will understand that the invention also applies to and is beneficial for round cables as well. The cable, in turn, is configured to be attached to an electrical device that is capable of processing the electric signal provided by the sensing element. In addition, a non-conductive spacing member is positioned proximally to at least a portion of the flat cable. The spacing member includes a layer of dielectric material.

Another aspect of the invention relates to a seat capable of supporting an occupant in a vehicle. The seat is also capable of characterizing the presence of the occupant. The vehicle seat includes a base member for accepting and supporting the occupant and a plurality of seat sensing elements disposed within the base member of the seat. Each of the seat sensing elements is capable of detecting the presence or absence of the occupant on a portion of the seat and includes an output having an electrical signal that indicates whether the sensor element detects the presence of an object. The vehicle seat also includes a flat cable having an electrical conductor that is attached to the sensing element output and is capable of being connected to an electronic device capable of characterizing the presence of the occupant.

Yet another aspect of the invention relates to a method of providing one or more electrical signals from a seat sensor assembly to an external device. The electrical signals are indicative of one or more attributes measured by the seat sensor assembly. The method includes aligning a seat sensing element with a seat. The seat sensing element is capable of sensing an attribute and providing an electrical signal output indicative of the attribute within a seat. The method also includes attaching a conductor between the electrical output of the seat sensing element and the external device so that the seat sensing element is in electrical communication with the external device. The method further includes disposing a non-conductive spacing member between the seat sensing element and the conductor to reduce coupling of an unwanted electrical signal onto the conductor.

The above summary is not intended to describe each disclosed embodiment or every implementation of the present invention. The figures and detailed description that follow more particularly exemplify illustrative embodiments.

BRIEF DESCRIPTION OF THE DRAWINGS

FIG. 6 is a perspective exploded view of opposing sections of a dielectric cable guard configured to enclose a flat flexible cable according to another embodiment of the invention.

FIG. 7 is a perspective assembled view of the dielectric cable guard of FIG. 6, with a flat flexible cable disposed between the sections of the dielectric cable guard.

FIG. 8 is a simplified electrical schematic of an electrical system of the vehicle of FIG. 1, including the seat sensor mat assembly and an electrical control unit connected via a flat flexible cable having a dielectric cable guard of the type illustrated in FIG. 5.

While the above-identified figures set forth several embodiments of the present invention, other embodiments are also contemplated, as noted herein. In all cases, concepts presented herein describe the invention by way of representation and not by limitation. It should be understood that numerous other modifications and embodiments can be devised by those skilled in the art which fall within the scope and spirit of the principles of this invention.

DETAILED DESCRIPTION

Figure 1:
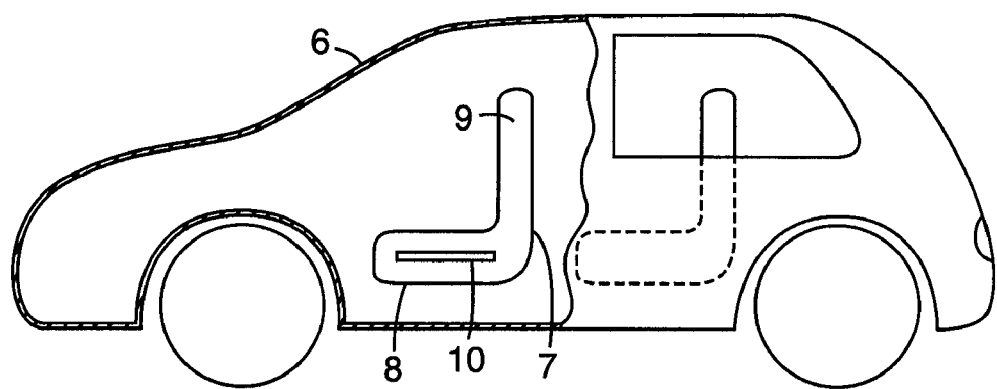
FIG. 1 is a schematic representation of a vehicle having a seat with a seat mat assembly disposed therein of the type suited for use with the present invention.
Figure 2A:
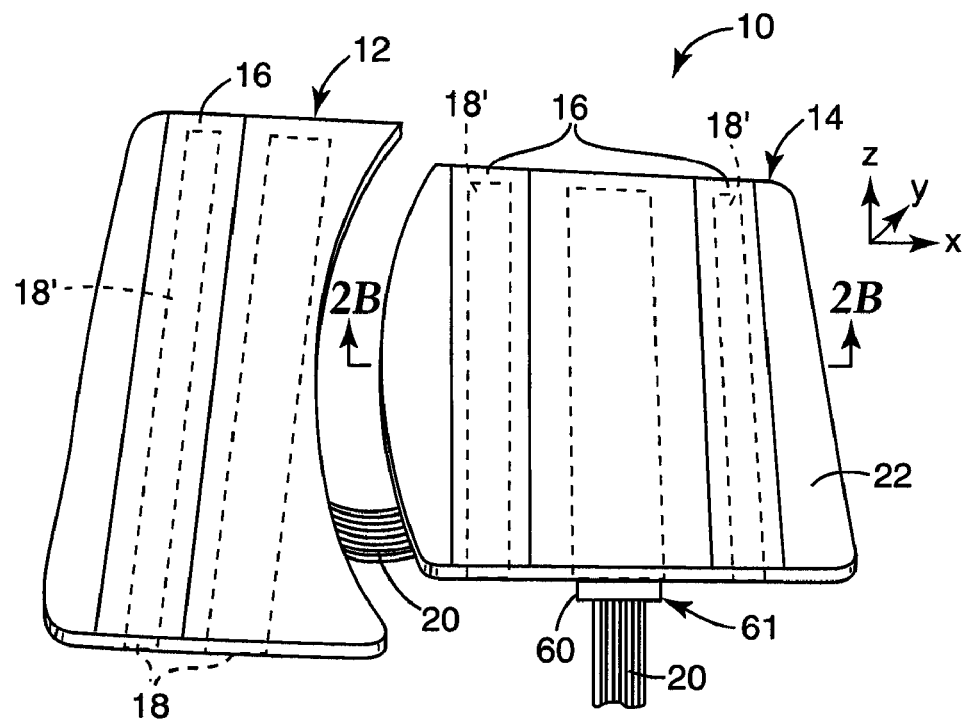
FIG. 2A is a perspective view of a first embodiment of a portion of the seat sensor mat assembly of FIG. 1 including a plurality of seat sensor antennas positioned on each of two opposing major surfaces of the seat sensor mat assembly.
Figure 2B:
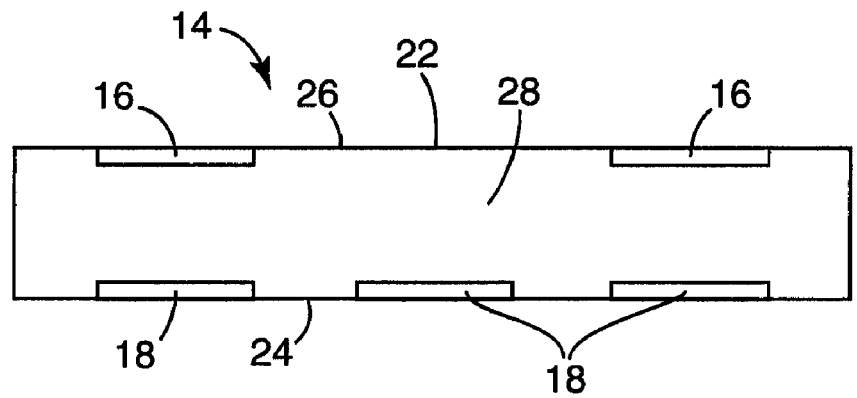
FIG. 2B is a sectional view as taken along lines 2B-2B in FIG. 2A.

Referring to FIGS. 1-2B, sensor mat assembly 10 is adapted to be positioned in a vehicle 6 having a seat 7 with a base portion 8 and a back rest portion 9 of the type suited for the present invention. Sensor mat assembly 10 includes a first mat portion 12 and a second mat portion 14 and is, in one embodiment of the invention, incorporated into the base portion 8 of the vehicle seat 7 (and optionally can be incorporated into both the base portion 8 and the back rest portion 9). Each of the first mat portion 12 and the second mat portion 14 can be made of a compressible material such as a foam or other suitable material. FIG. 2B is a cross section of second mat portion 14 and shows the internal components of the sensor mat assembly. In one embodiment, a cover 26 surrounds at least a portion of a compressible mat member 28. A plurality of sensing elements 16 are positioned proximal to a first major surface 22 of the sensor mat assembly 10 just beneath the cover 26. Similarly, a plurality of sensing elements 18 are positioned proximal to a second major surface 24 of the sensor mat assembly 10, where the second major surface 24 is spaced from the first major surface 22. Collectively, the sensing elements 16 and 18 are capable of sensing the presence of an object or human being, or both, in a volume proximally located to the vehicle seat. The volume described is the expected location of an object if it were to occupy the vehicle seat.

The individual sensing elements 16 and 18 may each sense the presence or absence of an object in a particular portion of the volume. Such an object may or may not be resting on the seat in a particular sensor's monitored volume. Sensing elements 16 and 18, in one embodiment, create an electric field which is altered by the presence of an object in the volume in which the field is created. In addition to detecting that a particular volume is occupied, the sensing elements 16 and 18 may, for example, provide information about the weight of the object, the density of the object, the total volume of the object, or other object attributes. Each of the sensing elements 16 and 18 provide an electrical signal as an output that is indicative of the status of a characteristic of the volume that each of the sensing elements is sensing. Each sensing element may provide an output signal indicative of one or more attributes.

Flat flexible cable 20 is shown extending between the first mat portion 12 and the second mat portion 14 as well as out of a side of the second mat portion 14. Embodiments described herein relate to flat flexible cables, but skilled artisans will understand the invention also applies to and is beneficial for round cables as well. Flat flexible cable 20 can extend out of second mat portion 14 at any location, including, for example, at a right angle (as shown) to the direction that it extends between the first mat portion 12 and the second mat portion 14. In one embodiment, flat flexible cable 20 has a plurality of conductors that are adapted to be separately connected to each of the output signals of the plurality of sensing elements 16 and 18. Flat flexible cable 20 is also attached to an electrical control module (ECU) 21 (as shown in FIG. 8) so that the output signals from the plurality of sensing elements 16 and 18 are electrically communicated to the electronic control module via the flat flexible cable 20. Flat flexible cable 20 is shown in FIG. 2A as being a single cable, but alternatively can be a plurality of separate cables.

A metal tab 63 can be positioned adjacent the flat flexible cable 20 at the location where the flat flexible location exits the second mat portion 14. The second mat portion 14 can be formed into a final shape after the sensing elements 16 and 18 and the flat flexible cable 20 are attached such as by using a laser to cut the second mat portion 14. The metal tab 63 is positioned to block a laser beam from engaging the flat flexible cable 20. The metal tab 63 can be attached to the second mat portion 14 and can remain a part of the sensor mat assembly 10 after the second mat portion 14 is laser cut.

Due to the nature of the sensing element, that is, because the antenna propagates a signal across the path of the unshielded wire, it is possible that a signal may be induced onto the unshielded signal wires that are connected to the ECU. Unwanted induced signals may provide false indicators to the ECU.

Figure 3:
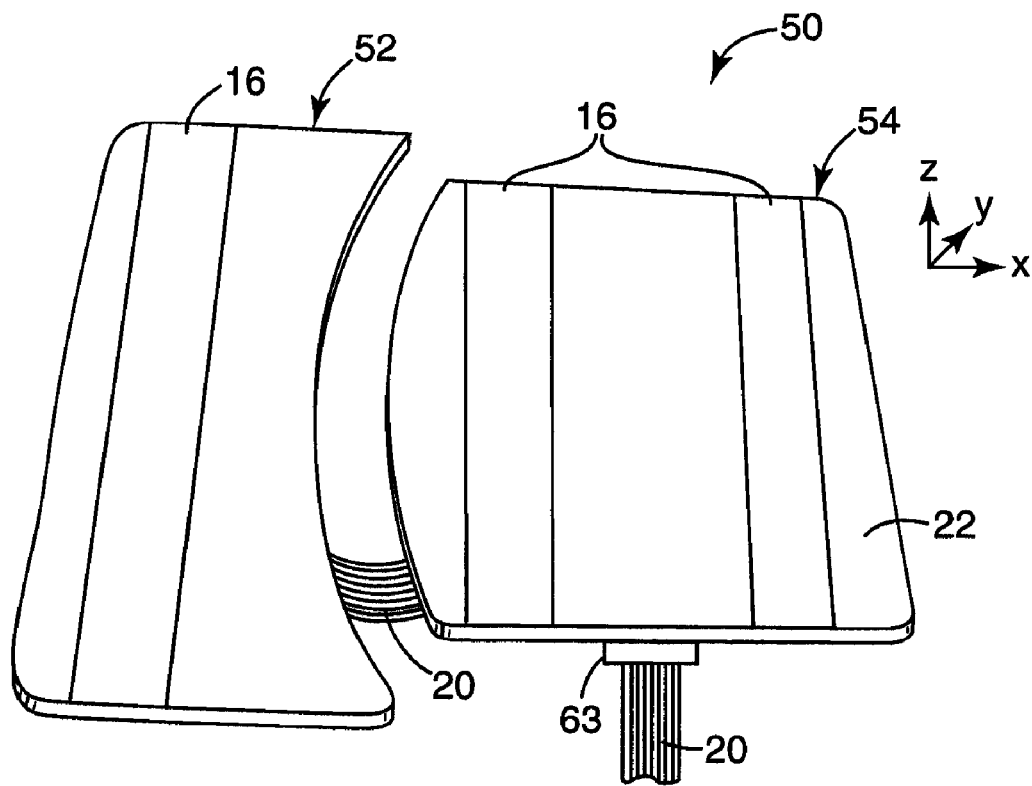
FIG. 3 is a perspective view of a portion of a seat sensor mat assembly including a plurality of seat sensor antennas positioned on one major surface of the seat sensor mat assembly of the type suited for a second embodiment of the invention.

FIG. 3 illustrates an alternative sensor mat assembly 50 suitable to be positioned within a vehicle seat similar to that of sensor mat assembly 10. Sensor mat assembly 50 includes a plurality of sensing elements 16 positioned proximal to a first major surface 22 of the sensor mat assembly. However, sensor mat assembly 50 does not include sensors positioned along its second major surface, unlike the sensor mat assembly 10. Flat flexible cable 20 is positioned within the sensor mat assembly 50 and has a plurality of conductors adapted to be connected to the output signals of the plurality of sensing elements 16.

Figure 4A:
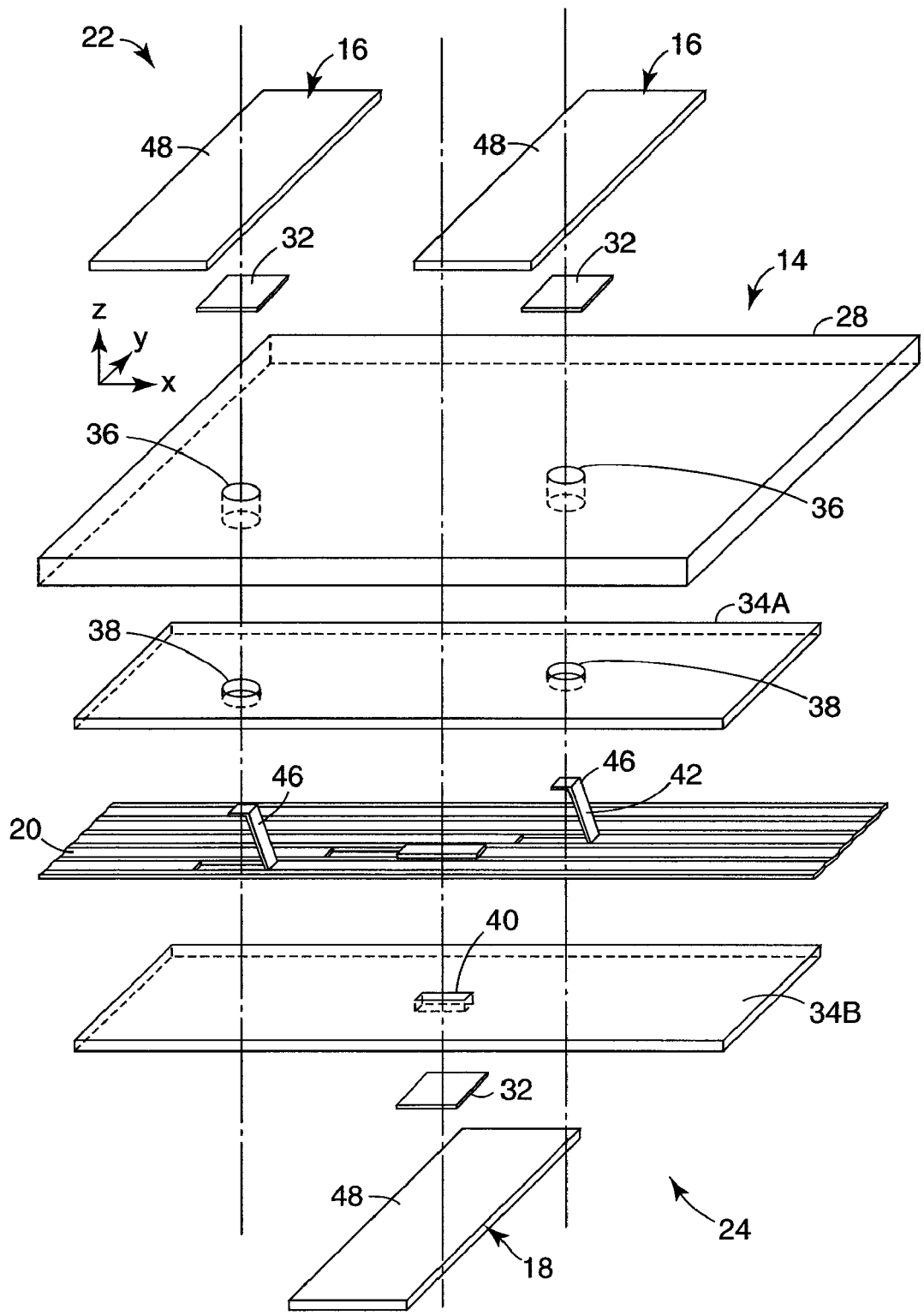
FIG. 4A is an exploded view of a portion of the seat sensor mat assembly of the type shown in FIG. 1A viewed from the perspective of a first major surface thereof, which has dielectric layers disposed between a flat electrical cable and sensor assemblies, according to the first embodiment of the invention.
Figure 4B:
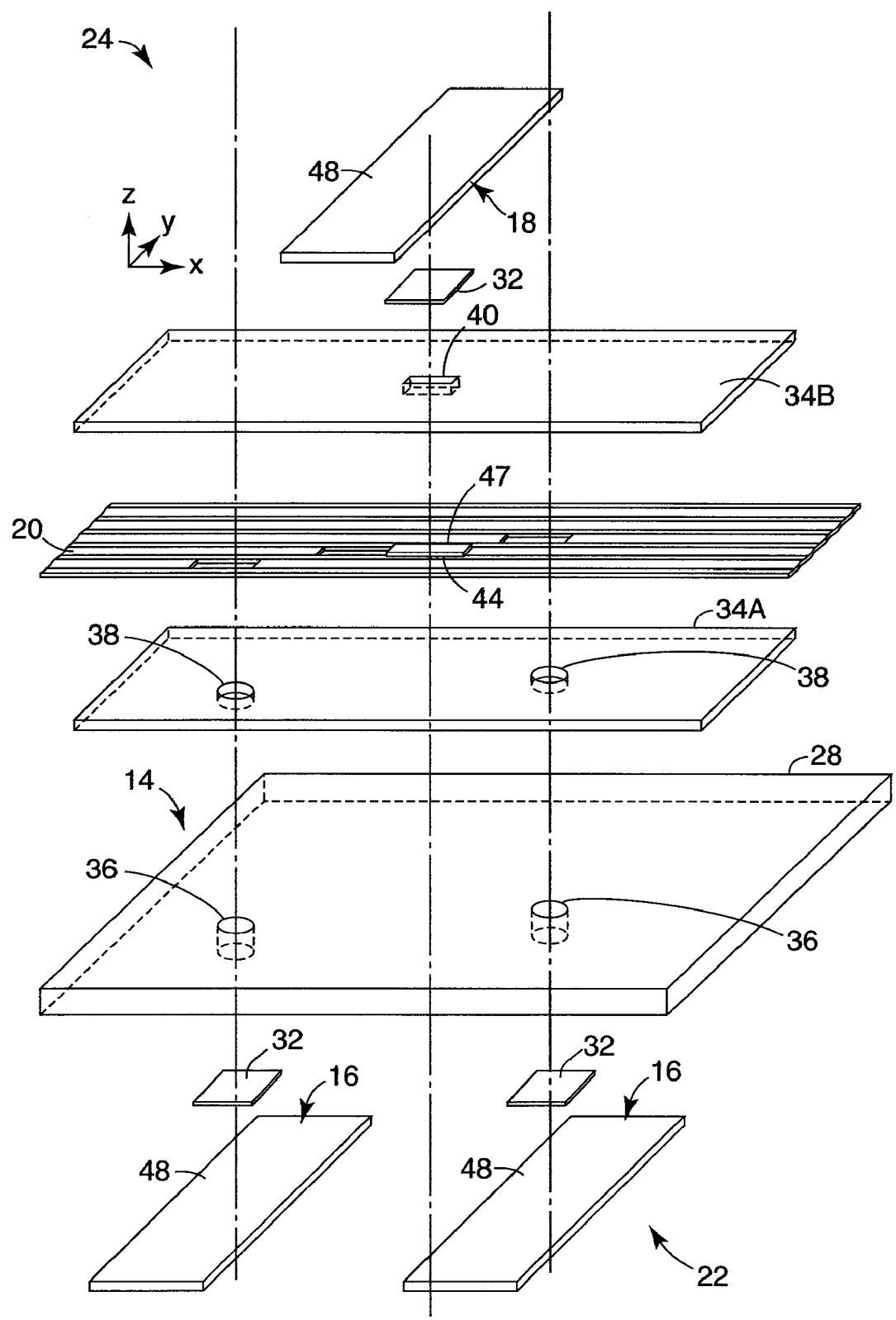
FIG. 4B is an exploded view of the seat sensor mat assembly of FIG. 1A viewed from the perspective of a second major surface opposing the first major surface shown in FIG. 4A.

FIGS. 4A-4B illustrate exploded perspective views of a portion of sensor mat assembly 10 including flat flexible cable 20 with a pair of dielectric layers 34A and 34B positioned on either side of the flat flexible cable according to one embodiment of the invention. FIG. 4A and FIG. 4B are taken from opposite perspectives, that is FIG. 4A is shown with the first major surface 22 positioned toward the top of the view and FIG. 4B is shown with the second major surface 24 positioned toward the top of the view.

Sensing elements 16 and 18 each include an antenna 48 and a conductive plate 32. When assembled, the conductive plate 32 is attached to, and in electrical communication with, the antenna 48. In addition, when assembled, the conductive plate 32 of each sensing element 16 and 18 is attached to a respective conductor 46 disposed within the flat flexible cable 20. Each of the conductors 46 of the flat flexible cable 20 are, in turn in electrical communication with the ECU 21.

A plurality of conductors 46 extend from the flat flexible cable 20 on one side thereof, with each of the extending conductors 46 shaped to have a terminal 42 configured to extend through the compressible mat member 28 (via an aperture 36) and be attached, for example by soldering, to the conductive plate 32 of one of the sensing elements 16. On the other side of the cable, a plurality of conductors 47 (only one is shown) are each folded over onto itself to provide a terminal 44 adapted to be attached to a conductive plate 32 of one of the plurality of sensing elements 18 (only one is shown).

An electrical source is provided to the each of the antennas 48, which, when energized, emits a field of energy. The presence of an occupant or object in the vehicle seat will absorb or deflect some of that energy field, thereby altering the signal returned to the sensing element (16 or 18) associated with that particular antenna 48. When there is an object in the particular volume sensed by the sensing element 16 or 18, the sensing element is said to be in a loaded state. When no object is positioned or detected within the particular volume, the sensing element 16 or 18 is said to be in an unloaded state. When the sensor is in an unloaded state, its output is at a first voltage level. When the sensor is in a loaded state, its output is at a second voltage level. The voltage level of each of the plurality of sensing elements 16 and 18 is provided to the ECU via a respective conductor 46 or 47 for that sensing element. The energy emitted by each of the sensing elements 16 and 18 can be controlled by the positioning of their respective antennas 48. However, it is possible that the signals can be emitted such that they are capable of being conducted or otherwise induced onto conductors 46 or 47 such that the ECU may not be able to determine whether a received input from a given sensing element 16 or 18 is at the first or the second voltage levels.

As mentioned above, the terminals 42 extend through the compressible mat member 28 to be attached to the sensing elements 16, which are located on an opposite side of the foam member from the flat flexible cable 20. In addition, the terminals 42 extend through an aperture 38 in a dielectric layer 34A disposed between the flat flexible cable 20 and the sensing elements 16. The dielectric layer 34A is provided to reduce the induction of unwanted signals onto the conductors 46 of flat flexible cable 20. The dielectric layer 34A is, in one embodiment, made of a micro-porous dielectric material having a thickness of about 25 millimeters and has a relative dielectric constant of about 1.13. The dielectric layer 34 is attached to the flat flexible cable 20 with a layer of adhesive, which, in one embodiment is about 2 millimeters thick. The size of the apertures 38 through which each of the terminals 42 extend are minimized to provide as much coverage with the dielectric layer over the conductors 46 within the flat flexible cable 20 as possible. The values and amounts provided herein are for illustrative purposes only. It should be appreciated that dielectric materials with different thicknesses and relative dielectric constants may be used, depending on various requirements and considerations, without departing from the scope of the invention.

As illustrated by FIG. 4A, another dielectric layer 34B is attached to the other side of the flat flexible cable 20. The dielectric layer 34B positioned on the other side can be made of a similar material, have a similar thickness, and use a similar adhesive. Because the conductors 47 do not extend through the compressible mat member 28, the terminals 44 thereof are folded back onto the flat flexible cable 20. Thus, an aperture 40 in the dielectric layer 34B for the terminal 44 is shaped differently than the apertures 36 in the dielectric layer 34A because of the different shape of the terminal 44.

Figure 5:
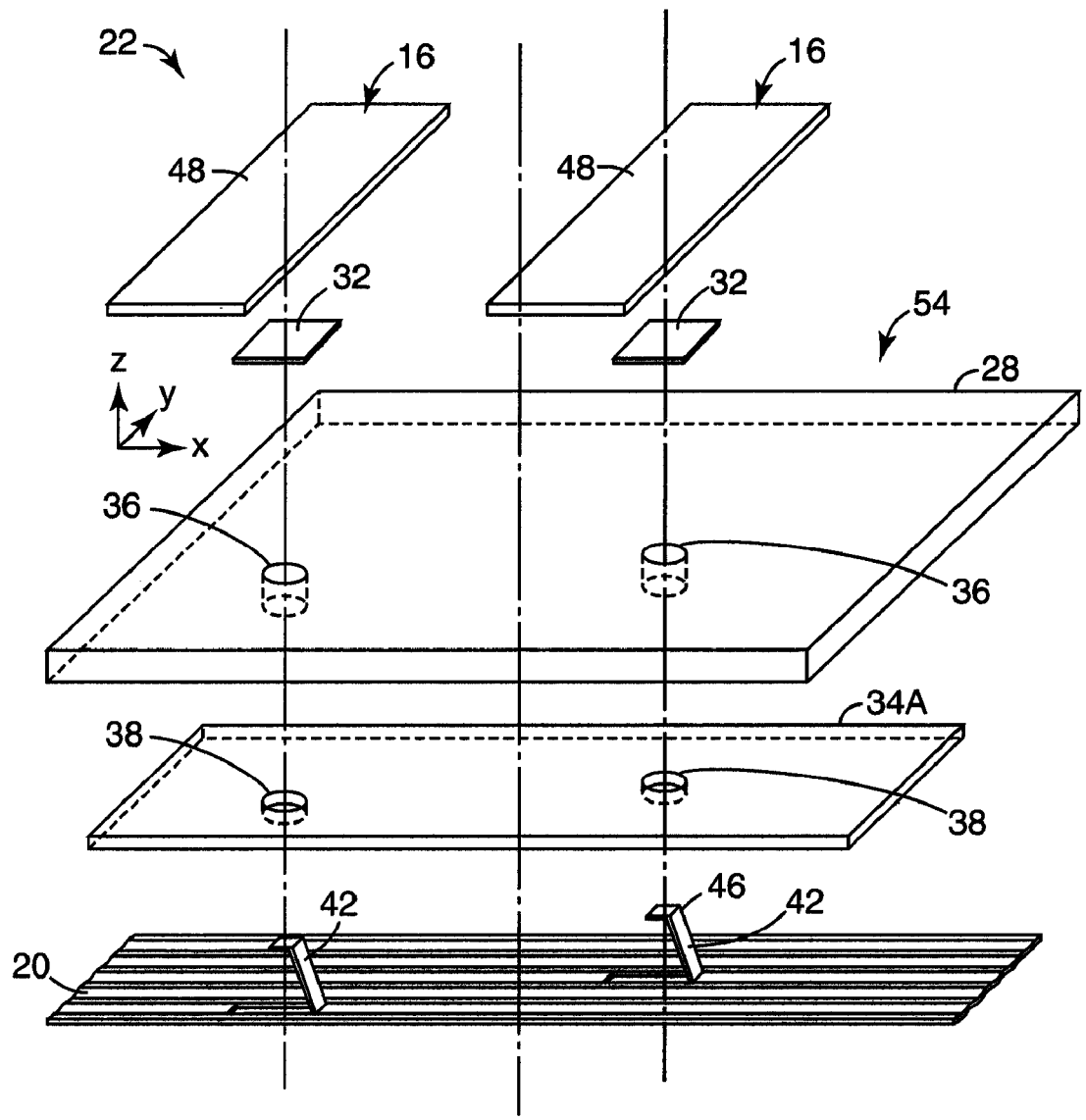
FIG. 5 is an exploded view of a portion of the seat sensor mat assembly of the type shown in FIG. 3, viewed from the perspective of the one major surface thereof, which has a dielectric layer disposed between a flat electrical cable and sensor assemblies, according to the second embodiment of the invention.

FIG. 5 is an exploded view of part of sensor mat assembly 50 (shown in FIG. 3), which has a first mat portion 52 and a second mat portion 54. The second mat portion 54 is similar to the second mat portion 14 shown in FIGS. 2A-2B and 4A-4B. However, second mat portion 54 includes only sensor elements 16, which are disposed on an opposite side of the compressible mat member 28 from the flat flexible cable assembly 20. Otherwise, the components of second mat portion 54 and their assembly are similar to those discussed above with respect to second mat portion 14.

FIG. 6 illustrates a dielectric cable guard 60, according to another embodiment of the invention. As discussed above, flat flexible cable 20 extends from the sensing elements 16 and 18 to the ECU. The portion of the flat flexible cable 20 positioned within the sensor mat assembly is generally protected from possible mechanical damage. However, once the flat flexible cable 20 exits the sensor mat assembly (as shown at 61 in FIG. 2A), the flat flexible cable 20 may be susceptible to mechanical damage in addition to being susceptible to unwanted signals being induced onto the cable (from outside sources (e.g., large metallic objects, batteries, electrical devices such as PDAs, cell phones, CD players or the like).

Dielectric cable guard 60 is formed of a flexible dielectric material and is configured to accept and enclose a portion of the flat flexible cable 20 to provide mechanical and electrical protection. In one embodiment, dielectric cable guard 60 has first and second mating sections 60a and 60b that, when assembled, defines a generally elongated shape. Each section of the cable guard 60 includes an inner surface 62 and an outer surface 68 with specific surface details. Inner surface 62 includes a generally planar mating surface 76 disposed along each side edge thereof. Mating surfaces 76 extend adjacent a generally planar channel 66, which is recessed from the mating surfaces 76 at edges 64. Channel 66 is of a sufficient width to accept flat flexible cable 20, which is placed or attached within the channel 66.

The outer surface 68 of each section of the dielectric cable guard 60 has a generally arcuate shape that extends away from an outer edge 78 of one mating surface 76 toward the outer edge 78 of the other mating surface 76. The outer surface 68 includes primary surface 70 that extends along a generally arcuate path and a plurality of generally arcuate ribs 72 that extend above the primary surface 70 from one mating surface 76 about the outer surface 68 to the other mating surface 76. As described above, the dielectric cable guard 60 is made of a dielectric material that is flexible and is thus capable of conforming to a wide variety of routing locations for the flat flexible cable 20. The ribs 72 provide added strength for the dielectric cable guard 60 when the dielectric cable guard is flexed or contorted to follow a path of the flexible flat cable 20.

FIG. 7 illustrates a flat flexible cable 20 positioned within the dielectric cable guard assembly 60, where the sections 60a and 60b are disposed on either side of the flat flexible cable 20. The sections 60a and 60b are aligned so that they engage each other along their respective mating surfaces 76. When the sections 60a and 60b are aligned, an aperture 80 is formed through the dielectric cable guard 60 by the alignment of channels 66 on each of the sections 60a and 60b. The flat flexible cable 20 extends through the aperture 80.

The sections 60a and 60b can be secured to each other and/or the flat flexible cable 20 in a variety of ways. In one embodiment, the sections 60a and 60b are attached to one another along their respective mating surfaces 76 with an adhesive. Alternatively, the sections 60a and 60b can be secured to by fasteners such as an adhesive backed tape (not shown) that extends around outer surfaces 68 of sections 60a and 60b to hold the sections 60a and 60b together. Alternatively, or in addition, the flat flexible cable 20 can be secured to each of the sections 60a and 60b along their respective channels 66. Alternatively still, the dielectric cable guard 60 can comprise a single molded member. The dielectric cable guard 60 can be formed (i.e., molded) directly onto and over the flat flexible cable 20, or molded separately with to include aperture 80 extending therethrough into which the flat flexible cable 20 is inserted.

FIG. 8 illustrates a simplified schematic of an electrical system of vehicle 6. As shown in FIG. 8, a battery 30 is electrically connected to the ECU 21. The battery 30 is also connected to a frame ground 31 of the vehicle 6. The battery 30 can be attached to the frame ground 31 at any point along the frame of the vehicle. FIG. 8 also illustrates the sensor mat assembly 10 electrically connected to the ECU 21 via the flat flexible cable 20, which is covered with dielectric cable guard 60. The dielectric cable guard 60 can have a connection 33 to provide an electrical attachment to the frame ground 31 of the vehicle 6 to provide improved protection from unwanted signals that may be conducted onto the flat flexible cable 20. In addition as mentioned above, the flexibility of the dielectric material that makes up the dielectric cable guard 60 allows for a variety of routing locations for flat flexible cable 20 with protection from mechanical damage from tools or other sharp objects that may be positioned near the flat flexible cable in areas such as under the seat 7.

As described above, signals from the antenna can couple onto signal wires. A simplified calculation of a coupling capacitance C between an antenna and a signal wire can be described as $C=\epsilon_0 *K*X*Y/Z$, where $\epsilon_0$ is the absolute dielectric constant, K is the relative dielectric constant of the material used in dielectric materials such as dielectric layer 34, X is the width of the flat flexible cable 20, Y is the width of the antenna 48, and Z is the thickness of the dielectric layer 34. The width of the flat flexible cable 20 is not easily reduced because of manufacturing concerns, and it is not desirable to reduce the width of the antenna 48, as it tends to reduce the signal of the sensing elements 16 and 18. Therefore, although decreasing K, X, and/or Y and increasing Z will all result in increasing the coupling capacitance, the primary focus on increasing the coupling capacitance centers on reducing K and increasing Z. In other words, selecting a material and a thickness for the dielectric cable guard 60 provides a means for achieving a best result of the product of K and Z. As described above, in one embodiment a micro-porous material was chosen having a relative dielectric constant of about 1.13 and a thickness of about 25 millimeters.

Because the sensing elements 18 and their antennas 48 are more closely located to the flat flexible cable 20 (relative to sensing elements 16), they are more likely to induce an unwanted signal onto the conductors 46 or 47. Without a dielectric layer 34 disposed between the flat flexible cable 20 and the sensing elements 18, the sensor response, that is the difference in the signal between an unloaded and an loaded state, was measured in the ECU as low as 4 counts on a 10-bit analog to digital converter (on a scale from 0 to 4092). With the addition of the dielectric layer 34, a minimum sensor response was observed to be almost 2000 counts. Therefore, it can be seen that the addition of the dielectric layer 34 provides a substantial improvement over a flat flexible cable without the dielectric layer.

In addition, the inclusion of the one or more dielectric layers 34 provides protection from other sources of potentially unwanted signals. For example, the metal tab 63 (as shown in FIG. 2A), which is positioned to protect the flat flexible cable 20 from being damaged during a laser cutting operation to trim second mat portion 14, can act as a low level antenna that can conduct unwanted signals onto the flat flexible cable 20. The dielectric layers 34 provide protection from the metal tab 63 and other similar structures to prevent them inducing undesirable signals onto the flat flexible cable 20.

Although the present invention has been described with reference to several alternative embodiments, workers skilled in the art will recognize that changes may be made in form and detail without departing from the spirit and the scope of the invention.

What is claimed is:

1. A sensor assembly configured to detect whether a seat in a vehicle is occupied, comprising:
   a plurality of sensing elements configured to be positioned within the seat, the seat having a base member with a mat positioned therein, wherein each of the plurality of sensing elements is capable of detecting the presence or absence of an object on a portion of the seat, and wherein each of the plurality of sensing elements provides an output of an electrical signal indicative of the detection;
   a cable having first and second layers of non-conductive material and a plurality of conductors positioned between and attached to the first and second layers, wherein the output of one of the sensing elements is in electrical communication with one of the conductors, wherein the same conductor is configured to be electrically coupled to an electrical device capable of processing the electrical signal from the same sensing element; and
   a first non-conductive spacing member formed from a dielectric material wherein the spacing member is attached to at least a portion of the cable and disposed between the cable portion and at least a portion of at least one sensing element.

2. The sensor assembly of claim 1, wherein each of the plurality of sensing elements includes an antenna capable of creating an electric field in a volume proximal to the seat.

3. The sensor assembly of claim 1, wherein the mat includes first and second opposing major surfaces and wherein at least a first sensing element of the plurality of sensing elements is positioned adjacent the first major surface of the mat.

4. The sensor assembly of claim 3, wherein at least a second sensing element of the plurality sensing elements is positioned adjacent the second major surface of the mat.

5. The sensor assembly of claim 4, wherein the cable is a flat cable, and wherein at least a portion of the flat cable is positioned between the first sensing element and the second sensing element.

6. The sensor assembly seat of claim 1, wherein the non-conductive spacing member has a thickness of at least about 25 millimeters.

7. The sensor assembly of claim 1, wherein the non-conductive spacing member is positioned adjacent the cable along the first layer of non-conductive material.

8. The sensor assembly of claim 1 wherein a portion of the cable extends out from the seat, and further comprising:
   a second non-conductive spacing member extending over at least a portion of the cable that extends from the seat.

9. The sensor assembly of claim 8, wherein the second non-conductive spacing member includes a plurality of ribs extending across its width.

10. The sensor assembly of claim 8, wherein the second non-conductive spacing member includes a first portion positioned adjacent the cable along the first layer of non-conductive material and a second portion positioned adjacent the cable along the second layer of non-conductive material and wherein each of the first and second portions include a cradle formed into a surface along their respective lengths and wherein at least a portion the cable is positioned within each of the cradles.

11. The sensor assembly of claim 8, wherein the second non-conductive spacing member is configured to be operably connected to an electrical frame ground of the vehicle.

12. A seat capable of supporting an occupant for a vehicle, the seat being capable of characterizing the presence of the occupant, comprising:
   a base member configured to accept and support the occupant including a mat having first and second major surfaces and positioned along at least a portion of the base member;
   a plurality of sensing elements disposed within the base member, each of the sensing elements capable of detecting the presence or absence of the occupant on a portion of the seat and having an output including an electrical signal indicative of the detection;
   a cable having first and second sides defined by two non-conductive layers with a plurality of electrical conductors disposed between and secured by the two non-conductive layers, wherein a first electrical conductor is coupled to the output of a first sensing element; and a first non-conductive spacing member having a layer of dielectric material and positioned adjacent at least a portion of the cable to reduce the conductance of unwanted electrical signals onto the plurality of electrical conductors, wherein the first electrical conductor is configured to be in electrical communication with an electronic device capable of characterizing the presence of the occupant.

13. The seat of claim 12, wherein each of the plurality of sensing elements includes an antenna capable of creating an electric field in a volume proximal to the seat.

14. The seat of claim 12, wherein each of the plurality of sensing elements are positioned adjacent the first major surface of the mat of the base member and wherein the first non-conductive spacing member is positioned between the plurality of sensing elements and at least a portion the cable.

15. The seat of claim 12, wherein a first sensing element of the plurality of sensing elements is positioned adjacent the first major surface of the mat and a second sensing element of the plurality of sensing elements is positioned adjacent the second major surface of the mat.

16. The seat of claim 15, and further comprising:

a second non-conductive spacing member having a layer of dielectric material, wherein the first non-conductive spacing member is positioned between the first sensing element and the cable and the second non-conductive spacing member is positioned between the second sensing element and the cable.

17. The seat of claim 12, wherein the cable comprises a flat cable, and wherein at least a portion of the mat is positioned between at least one of the plurality of sensing elements and the flat cable.

* * * * *

UNITED STATES PATENT AND TRADEMARK OFFICE
CERTIFICATE OF CORRECTION

| | | |
|---|---|---|
| PATENT NO. | : 7,391,223 B2 | Page 1 of 1 |
| APPLICATION NO. | : 11/538666 | |
| DATED | : June 24, 2008 | |
| INVENTOR(S) | : Patrick C. Howard | |

It is certified that error appears in the above-identified patent and that said Letters Patent is hereby corrected as shown below:

Column 5,
Line 63, delete "(".

Column 8,
Claim 4, Line 20, after "plurality" insert --of-- therefor.

Column 8,
Claim 10, Line 46, after "portion" insert --of-- therefor.

Column 9,
Claim 14, Line 17, after "portion" insert --of-- therefor.

Signed and Sealed this

Ninth Day of December, 2008

JON W. DUDAS
*Director of the United States Patent and Trademark Office*